July 15, 1958 — M. LUDWIG ET AL — 2,843,592
CATALYST UNIT AND GAS DISTRIBUTOR
Filed Sept. 1, 1954 — 2 Sheets-Sheet 1

INVENTORS
MILTON LUDWIG
DAVID B. WILLMER
ATTORNEYS

United States Patent Office 2,843,592
Patented July 15, 1958

2,843,592

CATALYST UNIT AND GAS DISTRIBUTOR

Milton Ludwig, Berkeley, and David B. Willmer, Danville, Calif., assignors, by mesne assignments, to California Research Corporation, San Francisco, Calif., a corporation of Delaware Application September 1, 1954, Serial No. 453,668

6 Claims. (Cl. 23—288)

This invention relates to catalyst units such as are used for disposing or treating of mixed gases having varying amounts of combustible components, for example, those from petroleum processes involving catalyst regeneration or fume disposal, and particularly refers to an arrangement of means forming a succession of superposed horizontal chambers, one of which is adapted to contain an extended body of catalyst for gas oxidation, together with means between the chambers for controlling and maintaining uniform gas velocities and pressures to and through the catalyst body.

The mass velocity for gas flow through a bed of uniformly spaced catalyst elements, for example, those known as "oxy-cat" units, of the general nature of those described in U. S. Patent No. 2,699,989, issued January 18, 1955, to E. J. Houdry, must be uniform across the area of the bed in order to insure complete reaction of the combustible mixture which is passed upwards through the bed. This uniform flow is necessary, since the oxidized combustion reaction may cease altogether in any area of the bed through which the flow exceeds a certain limiting design rate. Actually, however, there is a natural tendency toward non-uniform flow through the bed. This arises from the fact that the mass velocity through the bed is, for a given pressure drop, inversely proportional to the square root of the absolute temperature of the gas, as will be demonstrated. Thus, if the temperature in any part of the bed should, for any reason, drop slightly, the flow will increase and the reaction rate will decrease with a further decrease of temperature and increase of flow until the reaction stops altogether in this area because of excessive flow. The effect of temperature on turbulent flow through the catalyst bed is shown by the following development:

Let
$P$=pressure drop through bed, lbs./sq. ft.
$G$=mass velocity of gas flow through bed, lbs./hr./sq. ft.
$V$=specific volume of gas, cu. ft./lb.
$g$=gravity constant
$T$=mean absolute temperature of gas inlet
$C_1$=constant in pressure loss equation
$C_2$=constant in specific volume-temperature equation It is well known that:

$$P = C_1 V \frac{G^2}{2g}$$

for turbulent flow through a porous bed.

$$V = C_2 T$$

for a given perfect gas at constant pressure. Combining these equations, $$G = \sqrt{\frac{2gP}{C_1 C_2 T}}$$

or, in words, mass velocity through the bed is inversely proportional to the square root of absolute temperature if the pressure drop is constant.

Now, consider a bed without a flow distributing grid, where the exit gas is at 1600° F. and the incoming gas is at 700° F. The mean temperature of the gas in the bed is 1150° F. or 1610° R. But, suppose the reaction fails in some small area of the bed, for any one of a number of reasons, and the gas leaves that area at 700° F. or 1160° R. The relative mass velocity in this area will then be $$\sqrt{\frac{1610}{1160}} = 1.18$$

times the average velocity for the entire bed.

This greater flow may exceed the design rate for the bed so that combustion is not re-established in this area and part of the gas leaves the reactor without the desired combustion having taken place.

A flow distribution grid of the type contemplated by this invention and directly under the bed will, however, prevent this tendency toward non-uniform flow. The pressure drop through this grid may be, say, 10 times the drop through the catalyst bed so that any variation in pressure drop through a portion of the catalyst bed will have a negligible effect on flow through this portion. It is generally desirable that there be no large horizontal space for gas flow between the flow distributing grid and the catalyst bed; otherwise, cross flow in this space may cause non-uniform flow through the catalyst bed, even though the flow through the distributing grid is uniform.

It is contemplated that, in this example, the distributing grid should be designed as part of the support structure for the catalyst units. The top portion of the distributing grid must be made of heat-resistant material, such as firebrick, to resist radiation from the hot catalyst, but the grid supports may be of steel if the grid design is such as to shield the steel supports from direct radiation from the catalyst.

It is an object of this invention to provide an improved method and apparatus for receiving gas and mixing it to uniform combustibility and pressure prior to passing it through a distributed oxidation catalyst.

Another object is to provide a flow equalizer for large and fluctuating quantities of gas to be passed into and through an extended body of a catalyst material or the like.

Another object is to provide a gas mixer and distributor that will maintain its uniformity of action in the presence of a large quantity of radiant heat, such as that produced in an oxidation catalyst unit in close proximity to one face of the mixer structure.

Another object is to provide a gas distributor that will maintain uniformity of action by a control of pressure drop to prevent cumulative unbalance of operation of the catalyst elements due to changes in mass velocities and temperature.

Another object is to provide a gas distributor that also acts in conjunction with a superposed group of catalyst units to support them in a predetermined spaced relation as dictated by dimensional and structural considerations.

Another object is to provide a gas mixer and distributor that is simple to fabricate from standard and readily available forms of units such as refractory brick, and which is susceptible of easy and economical maintenance and repair.

These and other objects and advantages will be further apparent from the following description and the attached drawings, which form a part of this specification and illustrate a preferred embodiment of the invention.

Figure 1:
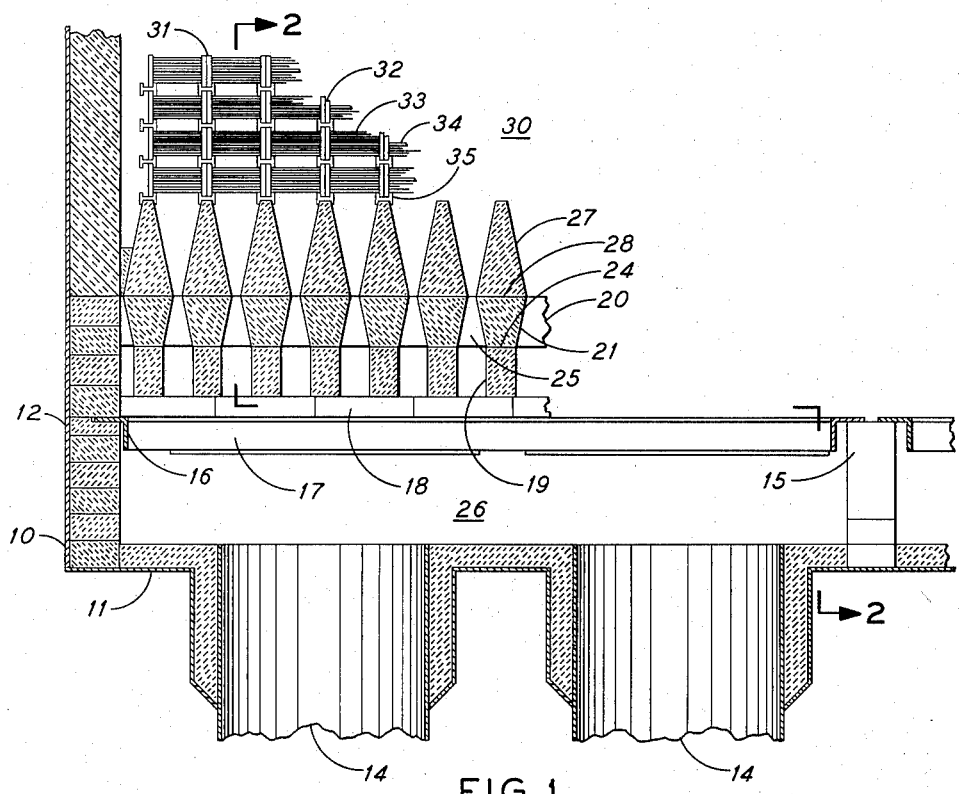
Fig. 1 is a vertical sectional view of a catalyst unit and gas flow equalizer to which the invention has been applied.
Figure 2:
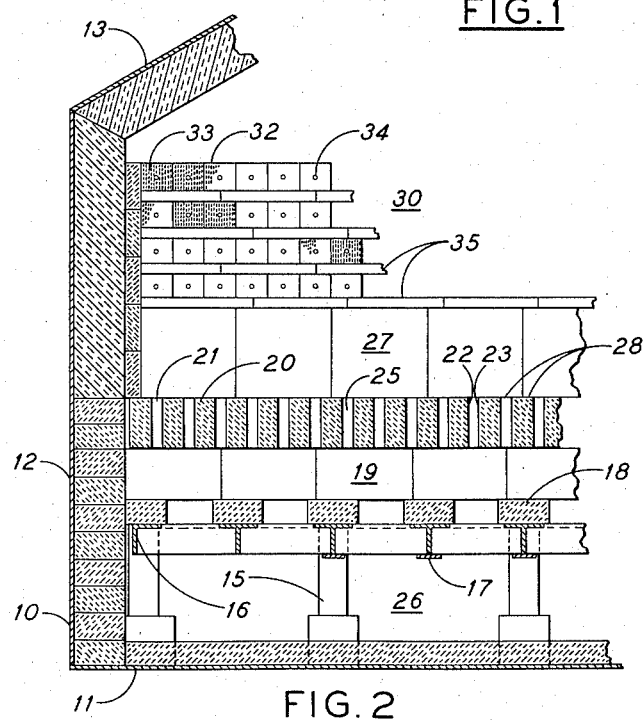
Fig. 2 is a transverse vertical sectional view on line II—II of the arrangement of Fig. 1.

Referring to the drawing, reference number 10 designates a housing, preferably of steel lined with a refractory material, such as insulating brick, having a floor 11, walls 12, and an outlet stack 13. A plurality of gas inlets 14 lead through the floor 11 and admit gas of various characteristics and velocities and from various sources (not shown) as required by the particular installations. A plurality of piers 15 extend upwardly from floor 11 and support a horizontal grating 16, preferably formed of high-temperature-resistant alloy steel members of the desired composition, the grating having longitudinal elements 17 transversely spaced to form horizontal supports for first rows of flat, rectangular, refractory blocks or bricks 18.

Figure 3:
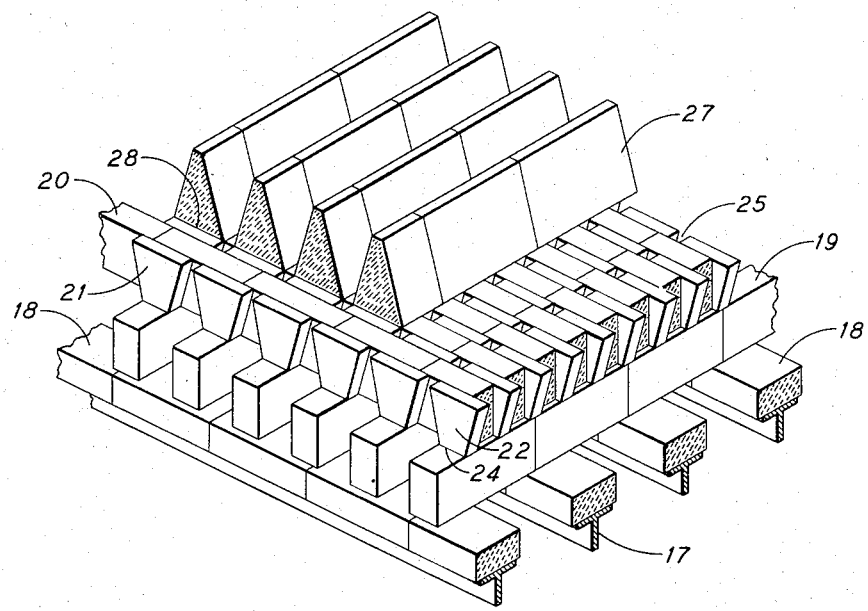
Fig. 3 is a perspective view, partly in section, showing a preferred arrangement of the components and supports of the gas equalizer brickwork.

At right angles to the first, or lowermost, rows of bricks 18 are second, longitudinally spaced, rows of rectangular bricks 19 set on edge as shown in Figure 3, to provide openings for gas coming upwardly through the spaces between the first rows of bricks 18. On top of the second transverse rows of rectangular bricks 19 is a third layer of alternate rows of two types of bricks extending longitudinally of housing 10, those bricks designated by reference numeral 20 being rectangular and set on edge, and those designated by reference numeral 21 being isosceles trapezoids with parallel flat faces 22 and 23, and set on their narrower ends 24 on the second transverse rows of bricks 19. The alternating rows of bricks 20 and 21 thus cooperate to form upwardly converging gas passages 25 having parallel sides defined by the spaces between the faces of rectangular bricks 19 that are not covered by the intervening trapezoidal bricks 21. These converging passages 25 are substantially uniformly distributed over the entire area of the brickwork layers in housing 10 and impose a substantially uniform pressure drop upon the gas streams entering chamber 26 below the brickwork layers and above the floor 11 of the housing.

To diffuse the gas emerging from the tops of the upwardly converging gas passages 25, and also to protect the brickwork layers already described from radiant heat from the catalyst bed, to be discussed below, a transverse fourth layer of isosceles wedge bricks 27 is placed. The wider bases 28 of these bricks substantialy coincide with and cover both the wider ends of the trapezoidal bricks 21 and the major part of the top edge faces of rectangular bricks 19 between the gas passages 25. The general effect is roughly illustrated by Fig. 1, and shows that the gas passages approximate a so-called "venturi" configuration, so that at least a part of the energy converted into velocity by gas passing into and through the converging gas passages 25 is recovered by the essentially diverging passages between the upwardly extending wedge bricks 27. It will be noted that these advantages are attained by a simple building up of substantially standard shapes of units such as refractory bricks, without molding, casting, special grinding, or otherwise altering their normal configuration.

In housing 10 and above the gas-diffusing layers of brickwork just described is an upper chamber 30, within which the catalyst elements generally designated 31 are horizontally disposed over the area of housing 10 and are supported in one or more layers. In this example, the catalyst elements 31 consist of vertical end members 32 of refractory material, perforated over their faces to receive the active catalyst rods 33, the end members being secured together by refractory tie rods 34 to form unitary blocks. The end members 32 rest upon horizontal rows of refractory saddles which retain the blocks to provide a uniform catalyst bed. The lowest row of saddles rest upon the tops of wedge bricks 27, as shown in Fig. 1. The gas-diffusing arrangement just described permits the catalyst elements 31 to be placed in a small housing to receive gases in a thoroughly mixed condition and at uniform pressure due to the upward travel of the gases through the grating 16 and the superposed brickwork with its specifically shaped and uniformly dispersed gas passages. This prevents localized hot spots in the catalyst units and has greatly increased their useful life. Desirably, the catalyst unit is designed for a low gas pressure drop, and this invention comprehends that a major portion of the over-all pressure drop through the entire unit is concentrated in the brickwork layers, which enhances the uniformity of operation. Obviously, the nature of the catalyst, the quantities of gases to be handled, and the allowable pressure drop in the system will dictate the areas of the gas passages to meet the conditions outlined, which will be apparent to one skilled in this art.

Although the designations "longitudial" and "transverse" have been applied to specific layers of the brickwork described above for convenience of identification in the drawing, it is obvious that the terms are mutually interchangeable and are not to be considered to be limiting. Also, the trapezoidal and wedge configurations of the brick elements 21 and 27, respectively, are intended to be broadly descriptive and therefore susceptible of substantial modifications, depending upon the application of the invention to specific conditions of size or operating requirements. In addition, the term "brick" or "refractory brick" is also illustrative and should not be considered as limiting of the application of the invention to any environment to which it is adapted. Consequently, those changes and modifications of the example given which fall within the scope of the appended claims are intended to be embraced thereby.

We claim:

1. A gas flow diffuser comprising a first layer of longitudinal rows of flat-topped spaced supports separated by parallel gas passages, a second layer of transverse rows of rectangular bricks alternated with flat-sided isosceles trapezoidal bricks, said trapezoidal bricks being spaced and inverted to form upwardly converging gas passages having parallel sides defined by said rectangular bricks, and a third layer of isosceles wedge bricks, the bases of said wedge bricks substantially coinciding with the widest end of said trapezoidal bricks.

2. A gas flow diffuser according to claim 1, in which the narrowest end of said trapezoidal bricks substantially coincides with the width of said supports.

3. A gas flow diffuser adapted to be placed upon parallel rows of spaced supports, comprising transverse alternate rows of rectangular and flat-sided isosceles trapezodial members, said last-named members being spaced and inverted to form upwardly converging gas passages having parallel sides, and superposed rows of isosceles wedge members, the bases of which substantially coincide with the widest end of said trapezoidal members.

4. A catalyst unit comprising means forming a lower horizontal chamber, a plurality of gas inlets for said chamber, an upper horizontal chamber, a catalyst bed in the bottom of said upper chamber, and a gas-diffusing layer of refractory brickwork between said chambers characterized by substantially venturi-shaped passages therethrough, said venturi-shaped passages being formed by a layer of alternate rows of rectangular units and inverted isosceles trapezoid units and a superposed layer of wedge units whose bases cover the widest end of said trapezoid units, the pressure drop of gas passing through said unit being greatest in said passages, whereby variations of pressure across said lower chamber are prevented from reaching said upper chamber and said catalyst bed.

5. A support assembly for a catalyst chamber, comprising a horizontal supporting grid substantially coextensive with said chamber, said grid having means forming a first layer of horizontal parallel passages extending across said chamber in one direction, and means forming a second layer of horizontal parallel passages extending across said chamber at right angles to said first passages, a gas flow equalizing refractory layer on said grid characterized by a plurality of substantially uniformly spaced vertical passages therethrough, and parallel rows of refractory bricks between said passages to form spaced supports for at least one layer of unitary catalyst blocks which extend only between adjacent rows of said parallel bricks.

6. A support assembly according to claim 5 in which said vertical passages converge upwardly, and the spaces between said rows of brick diverge upwardly.

References Cited in the file of this patent

UNITED STATES PATENTS

| | | | |
|---|---|---|---|
| 490,726 | Stevenson | Jan. 31, | 1893 |
| 1,722,339 | Pauling | July 30, | 1929 |
| 1,773,322 | Sindevan | Aug. 19, | 1930 |
| 1,936,154 | Carter | Nov. 21, | 1933 |
| 2,467,166 | Thorpe | Apr. 12, | 1949 |
| 2,634,118 | Jantsch | Apr. 7, | 1953 |
| 2,699,989 | Houdry | Jan. 18, | 1955 |
| 2,718,460 | Bowen | Sept. 20, | 1955 |

FOREIGN PATENTS

| | | | |
|---|---|---|---|
| 611,221 | Germany | Mar. 25, | 1935 |